United States Patent [19]

Lowry et al.

[11] 4,287,709
[45] Sep. 8, 1981

[54] CARRIAGE FOR A GRASS TRIMMING DEVICE

[76] Inventors: Joseph M. Lowry, 308 Sweetbriar Dr.; Ernest E. Griffin, 12306 Ridgefield Pkwy., both of Richmond, Va. 23233

[21] Appl. No.: 119,176

[22] Filed: Feb. 6, 1980

[51] Int. Cl.³ ............................................. A01G 3/06
[52] U.S. Cl. .................................... 56/16.9; 56/17.5; 56/255; 56/208
[58] Field of Search ...................... 56/255, 17.5, 16.9, 56/249, 200, 208; 248/27.1, 316 B, 500, 681; 24/248 SA, 263 A

[56] References Cited

U.S. PATENT DOCUMENTS

| | | | |
|---|---|---|---|
| 2,642,711 | 6/1953 | Smith et al. | 56/255 |
| 2,809,490 | 10/1957 | Oeters | 56/249 |
| 2,901,012 | 8/1959 | Crispin | 24/248 SA |
| 3,759,020 | 9/1973 | Simmons | 56/17.5 |
| 3,774,379 | 11/1973 | Mizobata et al. | 56/10.3 |

Primary Examiner—Robert A. Hafer
Attorney, Agent, or Firm—Cushman, Darby & Cushman

[57] ABSTRACT

A wheeled platform is provided with a centrally located aperture for receiving and supporting the lower portion of a housing for a grass trimming device so that the cutting element of the device will extend beneath the platform and the motor housing will extend above the platform; pivoted arms are mounted on the platform to extend along or across the aperture to engage and hold the housing in position in the aperture on the platform; locking devices are provided on the top of the platform to grasp the ends of the arms to hold them in a closed position; a telescoping handle is pivotally mounted on one end of the platform on the top side thereof.

9 Claims, 9 Drawing Figures

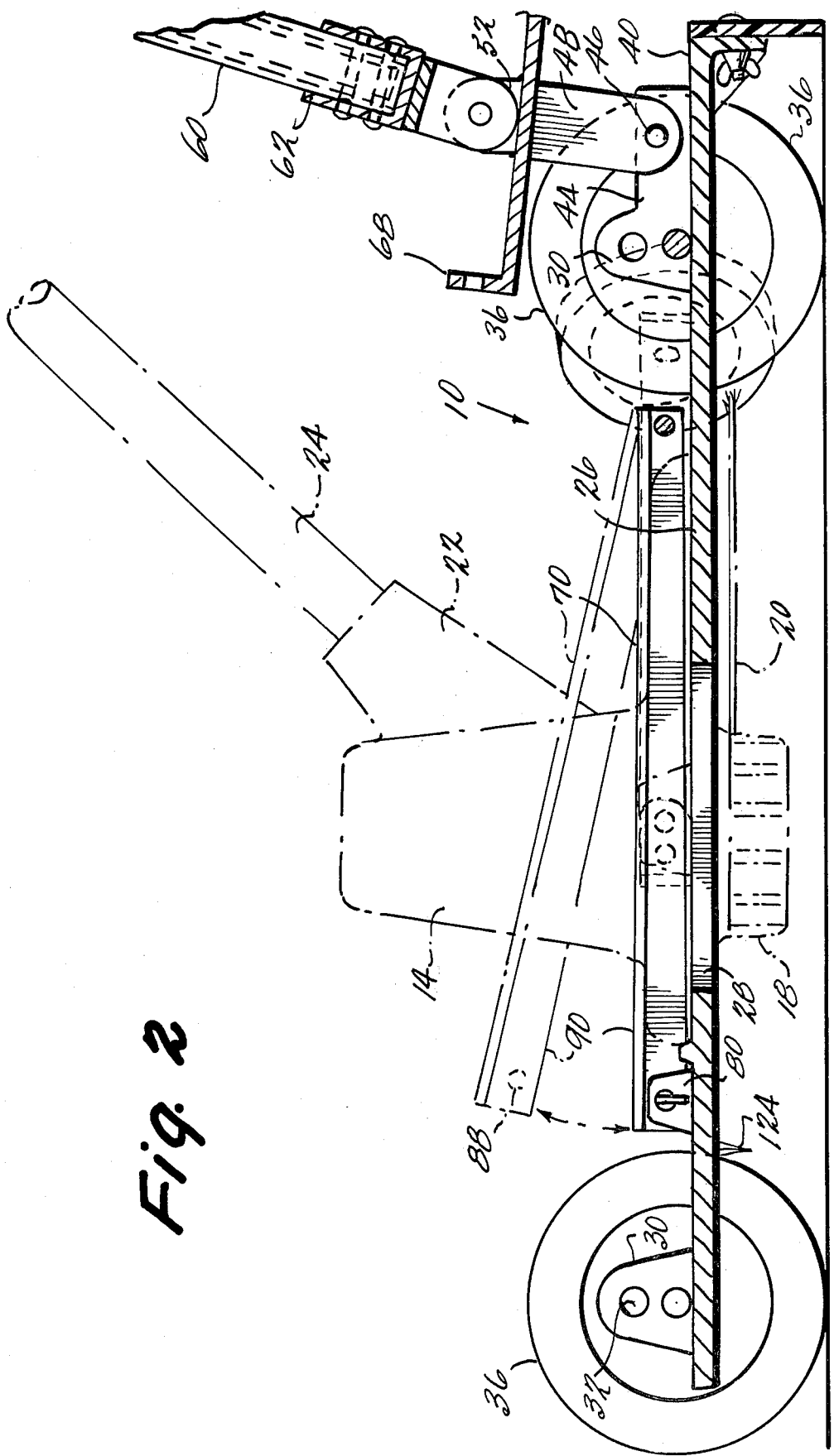
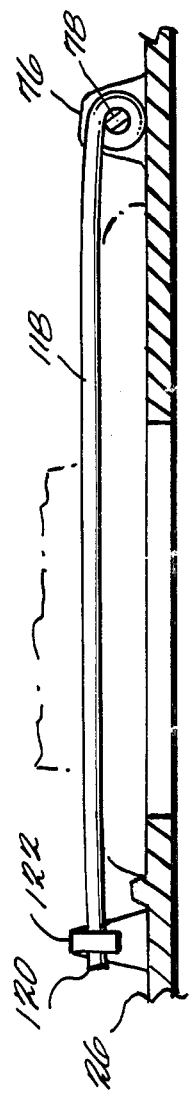

CARRIAGE FOR A GRASS TRIMMING DEVICE

BACKGROUND AND BRIEF DESCRIPTION OF THE INVENTION

The present invention relates to a carriage having wheels and a handle and an aperture for engaging and retaining a grass or weed cutting device of the type utilizing a cable rotated by a motor output to cut grass, weeds or the like close to objects that cannot be cut by the conventional power or hand mower.

For some years now, trimming devices in the form of rapidly rotated cables of nylon or the like have been employed to manicure lawns and cut weeds around objects that cannot be cut by a conventional lawnmower due to the inability of the mower to closely approach such objects as fences, trees, walls or the like. Such devices have been very popular since they have eliminated the task of operating hand clippers to trim the edges of lawns around objects such as those enumerated above.

However, in a number of circumstances, the weight of such devices has proved to be an impediment to their use and the fact that the devices have been designed to be hand held has also limited their application to a number of trimming jobs such as under large trees and bushes having extensively overhanging foliage, or under fixedly mounted lawn furniture. For long periods of operating time, the devices can be a considerable burden to handle due to their weight and due to the fact that care must be taken to maintain the electric cord in a safe position. Also, where the devices are gas operated, the weight of the motor and fuel can be a critical factor contributing to early fatigue for the user. Thus, where trimming devices of either the electrical or combustion engine driven type have been employed for working on estates, public parks or the like, worker fatigue will be a significant problem which will inevitably reduce efficiency. Additionally, use of these hand held type trimmers on certain landscapes can be dangerous such as where the terrain is very steep and where it is difficult for the operator of such a device to maintain a balanced foothold.

The present invention overcomes the foregoing disadvantages by providing a wheeled carriage for the electrical or gas driven trimming devices wherein such a device can be easily mounted and dismounted from the carriage and yet can be securely held on the carriage to greatly extend the working period by lessening worker fatigue. Further, use of the carriage of the present invention will enable an operator to cut grass and weeds in locations that have previously been inaccessible for hand held operation such as under trees with low hanging boughs, porches or lawn furniture or the like. Additionally, the carriage of the present invention is provided with a telescoping handle so that an operator will be able to cut or trim edge sections located on steep banks while being able to stand at a distance from the cutting site.

In summary, the carriage of the present invention is designed for cooperation with electrically driven or gas driven trimming devices of the type where a section of cord extends from a motor output and which is rotated at high speeds about a central axis of the motor. Conventionally, such devices have a skirt portion extending from the motor housing with the motor located above the skirt portion and the cutting cord located below the skirt. The carriage of the present invention includes a platform having a central aperture into which the skirt portion can be fitted and held be releasable retaining arms so that the trimming device can be easily inserted and removed from the carriage without difficulty as may be frequently required during a grass trimming operation. The releasable retaining arms cooperate with the aperture in a unique manner to securely hold the motor housing in position on the carriage while providing easy removal of the cutting device from the carriage. Also, the present invention provides a fifth wheel for the carriage to permit the platform of the carriage to be tilted to the horizontal to facilitate trimming along the edge of a lawn thereby avoiding the tiresome necessity of holding the cutting device entirely by hand at an angle to the edge to be trimmed.

Other features and advantages of the present invention will become apparent as consideration is given to the accompanying detailed description taken in conjunction with the accompanying drawings, in which:

BRIEF DESCRIPTION OF THE DRAWINGS

FIG. 2 is a view along line 2—2 of FIG. 1;

FIG. 6 is a detailed view of another embodiment of the retaining arms of the present invention;

DETAILED DESCRIPTION OF THE INVENTION

Figure 1:
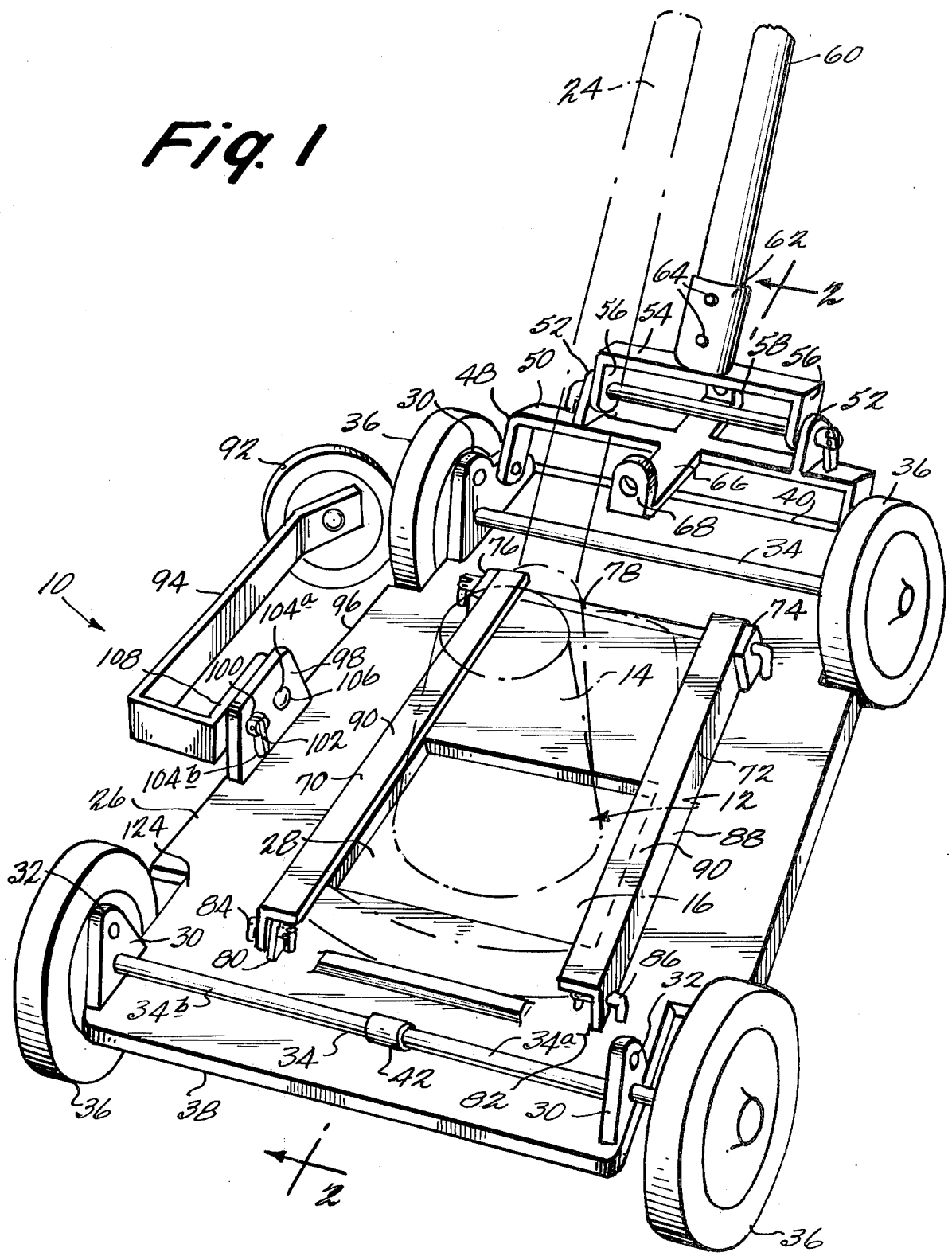
FIG. 1 is a perspective view of the carriage of the present invention showing, in phantom lines, a grass trimming device mounted on the carriage.

Referring now to the drawings, there is shown in FIG. 1 the carriage 10 of the present invention on which is supported a conventional grass trimming device shown in phantom lines at 12. The carriage of the present invention is designed to cooperate with a grass trimming device 12 which is of the type having a motor housing 14 which extends upwardly from a peripheral skirt portion 16. As shown more clearly in FIG. 2, protruding from the bottom of the housing 14 is a circular rotor 18 to which is attached, interiorly thereof, a plastic cord 20 which is the cutting element of the trimming device 12. In operation, wherein an electric motor is enclosed within a housing 14, a rotor 18 is fixed to the output of the motor to rotate about the central axis of the motor at high speed so as to carry the cord 20 with it in a circular motion as is well known.

Power for the motor in the housing 14 is provided through an electric cord which extends through a handle mount 22 and handle pole 24.

According to the present invention, a rigid platform 26 is provided with a substantially centrally located aperture 28 through which the rotor 18 and cord 20 are inserted when the trimming device 12 is mounted on the carriage 10.

The platform 26 is generally rectangular in plan view and has four wheel mounting posts 30 at each of its corners. Each of the posts may have a plurality of apertures such as at 32 for receiving axle rods 34 on the outer ends of which wheels 36 are releasably mounted in a conventional manner. With this arrangement, the vertical height of the platform 26 above the ground can be adjusted in a number of ways. For example, the front edge 38 of the carriage 10 may be lowered relative to its rear edge 40 by passing the front axle rod 34 through the lower set of apertures 32 while the rear axle rod is inserted through the upper pair of apertures in the rear posts 30. Of course, while only two sets of apertures are illustrated for the front and rear edges, it will be understood that a plurality of apertures can be supplied to greatly vary the inclination of the platform 26 with respect to the horizontal.

The axle 34 adjacent the front edge 38 may be of a telescoping type so that by loosening nut 42 the inner rod 34a may be slid out from the outer rod 34b to space the front wheels 36 outwardly from the platform 26 to eliminate any possibility of interference with the cutting operation of the cord 20.

Each of the rear wheel posts 30 have rearwardly extending walls 44 as shown more clearly in FIG. 2, each of which have aligned apertures for receiving pins 46 for pivotally supporting ends of a handle mount 48. The handle mount 48 has a cross bar 50 on which are mounted spaced apart apertured ears 52. A handle yoke 54 is provided which has downturned apertured ears 56 which are mounted on a pin 58 which extends through the apertures for ears 56 and 52 to mount the yoke 54 on the crossbar 50. A telescoping handle rod 60 is mounted in the hollow cylindrical well 62 which is securely attached as by riveting or is integrally made with the yoke 54. Pins 64 securely hold the end of the telescoping handle rod 60 in the well 62 but, of course, other means such as a threaded connection may be employed. At its free end, the rod 60 has a handle (not shown).

The crossbar 50 is provided at its midpoint with a cross-extension 66 which has, at its opposite ends, upturned apertured ears 68. With this arrangement, removable pin 58 can be employed to mount the yoke 54 for pivotal movement on cross-extension 66 when the platform 26 is to be operated at an angle to the horizontal, as will be explained in more detail hereinafter.

In order to hold the trimming device 12 securely on platform 26, according to the present invention, there are provided retaining arms 70, 72 each of which has one end pivotally mounted on the platform 26. Specifically, the platform 26 is provided with a pair of perpendicularly extending ears, on one side of the aperture 28 and one at 76 on the opposite side of the aperture 28. Each retaining arm 70 and 72 is also apertured and a pivot rod 78 is releasably inserted through the respective apertures of the ears and retaining arms as illustrated in FIG. 1 whereby the retaining arms are pivotable about an axis that lies parallel to the surface of the platform 26. On the side of the aperture 28 opposite the position of the ears 74 and 76, there are provided a corresponding set of apertured ears 80 and 82. The opposite ends of the retaining arms 70 and 72 are similarly apertured to receive retaining pins 84 and 86.

In this embodiment, each of the retaining arms 70 and 72 is L-shaped in cross-section with a wall 88 disposed to extend substantially perpendicular to the surface of the platform 26 when the retaining arm is in its closed position and a wall section 90 which will be disposed to extend parallel to the surface of the platform 26 when the respective arm is in its closed position. With this arrangement, when the retaining arms are closed and locked, the walls 88 will restrain the trimming device 12 from horizontal movement and the wall 90 will prevent vertical movement since these wall sections will engage the upper portion and side portion of the skirt 16 of the trimming device 12.

Figure 3:
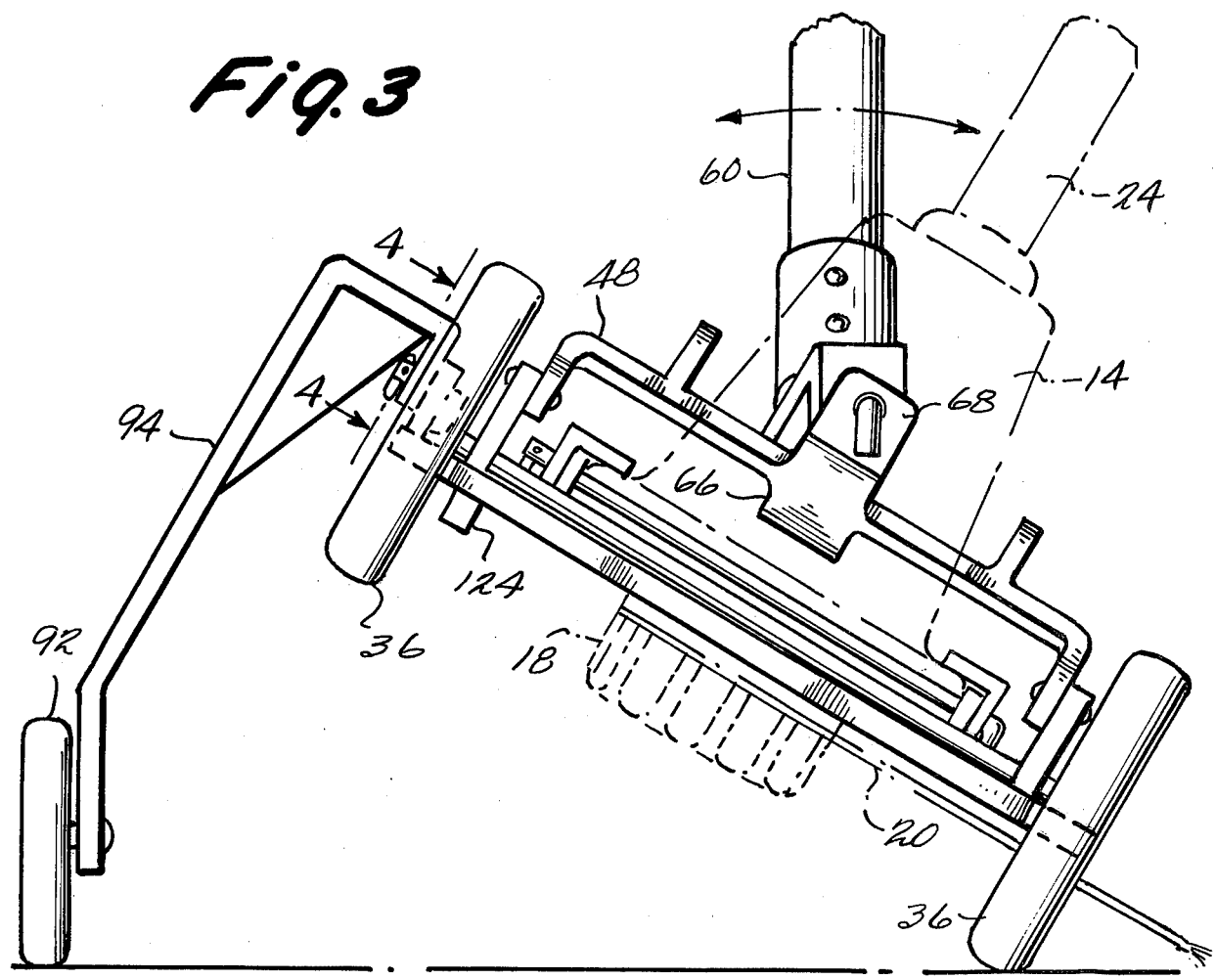
FIG. 3 is a front view in elevation showing the fifth wheel in its operating position.
Figure 4:
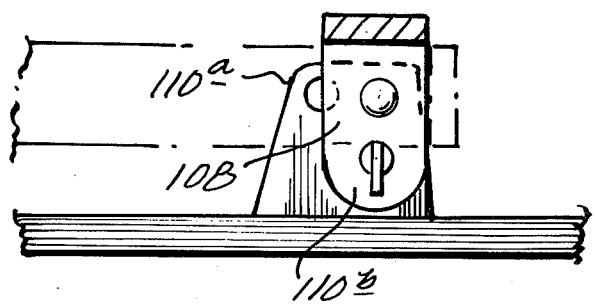
FIG. 4 is a detailed view of the mounting member for the support arm of the fifth wheel.

It frequently happens that, along a path or driveway, the grass or weeds will extend generally horizontally close to the surface of the path or driveway, thus rendering it difficult to cut the growth while holding the trimming device with the axis of the motor perpendicular to the ground. In such situations, it is desirable to tilt the trimming device so that the cord 20 will cut down on the grass or weeds and, to this end, the present invention provides a fifth wheel 92 which is rotatably mounted on the end of a pivoting leg member 94 which can be moved from a stored position as shown in FIG. 1 to an extended position as shown in FIG. 3. To this end, side edge 96 of platform 26 is provided with a vertically extending ear 98 which is provided with a first aperture 100 through which a releasable pivot pin 102 is disposed to allow pivotal movement of the arm 94 thereon and two positioning apertures 104a and 104b for receiving a locking bolt 106. The attaching end 108 of leg 94 is provided with two spaced apertures as shown in FIG. 4 at 110a and 110b. With this arrangement, the leg member 94 can be rotated about pin 102 to align aperture 110b with either aperture 104a or 104b to permit locking of the leg 94 in either the retracted or extended position.

When the platform 26 is tilted as shown in FIG. 3, the telescoping handle rod 60 is attached to cross-extension 66 of the handle mount 48 as shown in FIG. 3 to facilitate guiding the carriage 10 in the tilted position.

Figure 5:
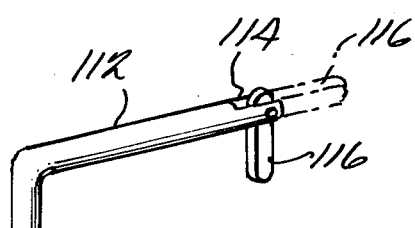
FIG. 5 is a perspective view of a link rod.

As shown in FIG. 5, a useful structure for the pivot pin 102 as well as the retaining pins 84 and 86 is shown in the form of a bent rod 112 which has a split end 114 in which is carried a pivotable toggle 116 to facilitate insertion through the respective apertures when in the phantom line position of FIG. 5 and yet which will securely retain its associated elements when in the solid line position of FIG. 5.

Another embodiment of the retaining arms 70 and 72 is shown in FIG. 6. In this embodiment, a metal rod 118 has one end pivotally mounted on rod 78 while its opposite end 120 is captured in the neck of a downwardly opening hook 122 located in the place of ear 80. An identical arrangement is provided for the other retaining arm and will therefore not be described. With this arrangement, the rods having a small degree of flexibility can accommodate a wider variation in dimensions in the skirt portion 16 of the grass trimming devices 12 and yet will securely hold the skirt portion on the platform 26.

If desired, the aperture 28 on platform 26 can be elongated to permit shifting of the grass trimming device relative to the front and side edges of the platform 26. This will enable a user to vary the cutting pattern since the length of cord 20 on many of these types of grass trimming devices can be varied by a simple adjustment. However, where an operator has extended too great a length of cord 20, the underside of platform 26 is provided with a knife edge 124 which may preferably be located immediately behind the front wheels 36 adjacent one side edge of the platform 26 so as to define the appropriate radius of the cutting cord 20.

Figure 7:
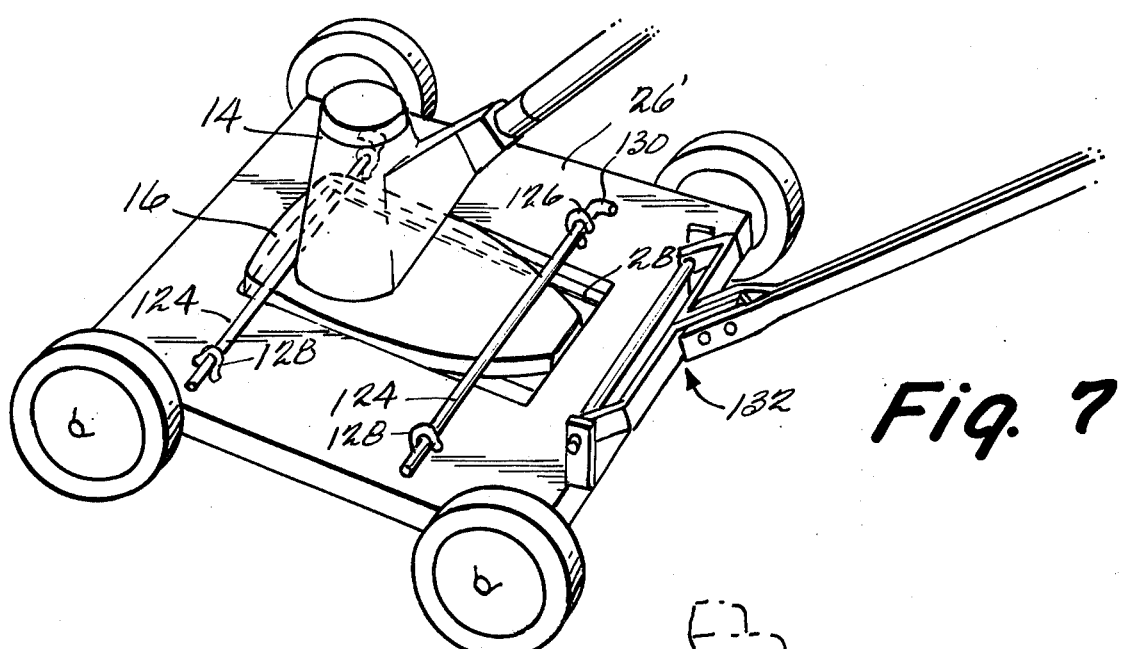
FIG. 7 is a perspective view of an embodiment similar to that of FIG. 6 showing the disposition of both arms.

In FIG. 7, there is shown another embodiment similar to that of FIG. 6 but where the retaining arms in the form of rods 124 extend transversely to a platform 26'. In this embodiment, one end of each of the rods 124 is pivotally retained in eyelet 126 while the other ends of each of the rods are releasably retained in oppositely facing hooks 128 which have their opening facing downwardly towards the platform 26'. The retaining rods 124 extend across the skirt 16 of the grass trimming device 14. The ends of the rods passing through the eyelets 126 may be bent as at 130 to retain the rods in the eyelets 126. Preferably, the skirt 16 will project upwardly from the platform 26' a sufficient distance so that the retaining arms 124 will have to be bent slightly when their free ends are held in the hooks 128 to thereby provide a firm yet resilient retention of the trimming device in the aperture 28.

The platform 26' of FIG. 7 may also have the fifth wheel arrangement illustrated in the above described embodiments of FIGS. 1-5 as well as the same telescoping rod mounting arrangement, although the simplified handle mount of FIG. 7 as shown at 132 may also be employed to reduce the overall manufacturing cost of the device.

Figure 9:
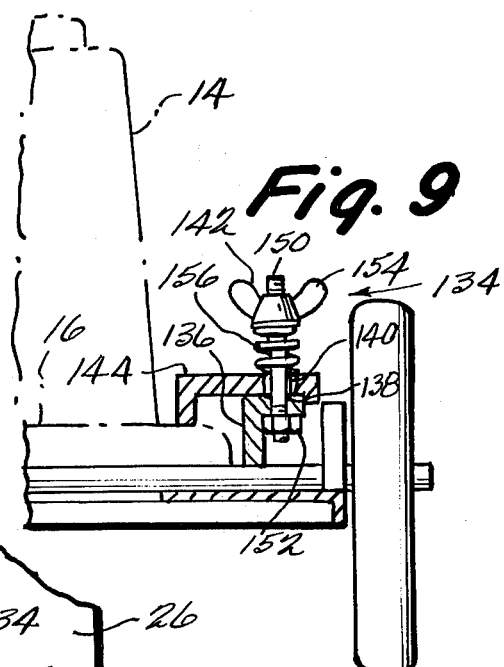
FIG. 9 is a view along lines 9—9 of FIG. 8.
Figure 8:
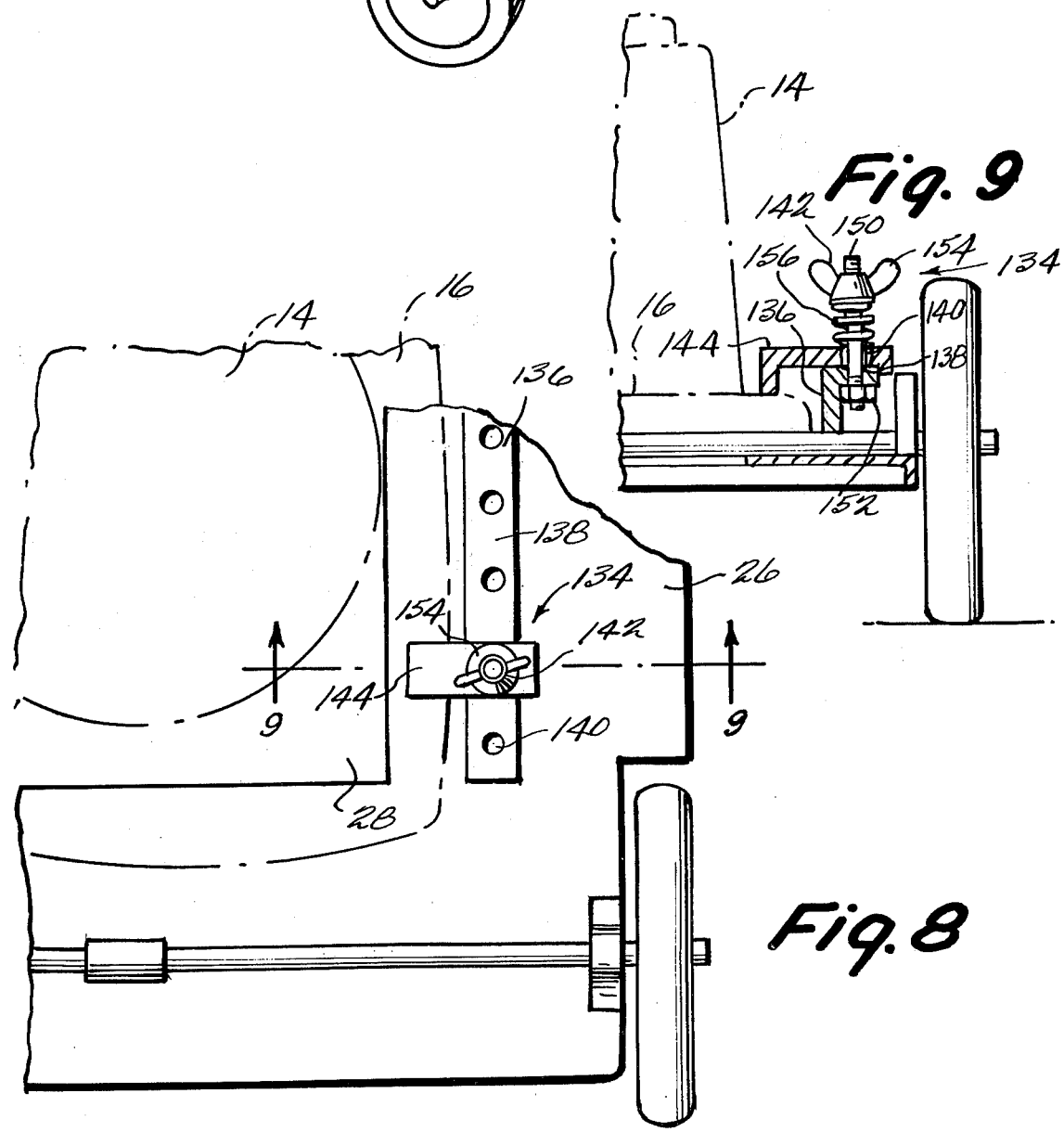
FIG. 8 is a partial top plan view showing yet another embodiment.

As shown in FIGS. 8 and 9, another embodiment of the retaining arms of the present invention is illustrated at 134. In this embodiment, a right angle flanged bar 136 is secured to or made integral with the platform 26 and extends upwardly therefrom and is provided with a flange 138 which extends parallel to the surface of the platform 26. The flange 138 may be provided with a plurality of apertures such as at 140 to receive the clamping means 142. As shown in FIG. 9, the clamping means comprises a retaining arm 144 which has a downturned flange 146 at one end thereof for engaging the topside of the skirt 16 of the grass trimming device 14. The other end of the retaining arm 144 has an aperture 148 through which a threaded bolt 150 is disposed. At one end of the bolt 150 a nut 152 is secured while at the other end a wing nut 154 is provided. A coil spring 156 is inserted over the bolt 150 between the wing nut 142 and the retaining arm 144. With this arrangement, tightening of the wing nut 142 while holding the nut 152 stationary will provide a resilient retention of the retaining arm 144 against the skirt 16 while loosening of the wing nut 142 will permit pivoting movement of the retaining arm 144 out of the way of the skirt to facilitate removal of the grass trimming device from the platform 26. A plurality of clamping means 142 will be provided for attachment to the bar 136 on either side of the skirt 16 to provide firm but resilient attachment of the skirt to the platform 26. For very light models of grass trimming devices 14, it should be possible to hold the skirt firmly in the aperture 28 with a pair of clamping means, one located on each side of the motor.

The main body of the carriage 10 may be made of metal, wood or high impact plastic with the axles and pivot pins being made of metal rod material. While the embodiments shown in the drawings illustrate the retaining arms as extending from the rear towards the front edge of the platform 26, it will be understood that the present invention also contemplates extending the retaining arms from one side edge to the other as this can be easily accomplished to provide the same secure mounting for presently available grass trimming devices.

Having described the invention, it will be apparent to those skilled in this art that various modifications may be made therein without departing from the spirit and scope of the present invention as defined in the appended claims.

What is claimed is:

1. A carriage for a trimming device of the type having a motor, a housing for the motor, a cutting element in the form of a length of cable connected to said motor so as to be rotatable about an axis at high speed for cutting grass, weeds and the like, said carriage comprising:

a platform having a top and a bottom side, means for supporting said platform for movement over the ground, an aperture in said platform for receiving and supporting a motor driven cutting device, releasable clamping means movably mounted on said top side of said platform for securely holding the cutting device in said aperture with the cutting element disposed to extend from said bottom side of said platform and with the motor on said top side thereof above said aperture, said clamping means including first and second retaining arms each having one end pivotally mounted on said top side of said platform at spaced apart locations, each arm being pivotable between an open position, wherein said aperture in said platform is unobstructed by said arms, and a closed position, wherein each said arm extends to a respective portion of said platform on the side of said aperture opposite to said respective locations, said platform having grasping means for engaging and releasably holding the other ends of said retaining arms so that, when a motor housing is disposed in said aperture, said retaining arms will engage the housing when said retaining arms are in said closed position, arms so that, when a motor housing is disposed in said aperture, said retaining arms will engage the housing when said retaining arms are in said closed position, said grasping means comprising a pair of flange members mounted on said platform and each extending substantially perpendicular to said platform and each being located so as to cooperate with an associated retaining arm, pin receiving apertures in each said flange member, said retaining arms each having, adjacent said respective other ends thereof, pin receiving apertures therein each located so as to be alignable with said pin receiving aperture on an associated flange member, when said retaining arms are in said closed position, pin means for insertion into said respective apertures of said flange members and retaining arms.

2. A carriage for a trimming device of the type having a motor, a housing for the motor, a cutting element in the form of a length of cable connected to said motor so as to be rotatable about an axis at high speed for cutting grass, weeds and the like, said carriage comprising:

a platform having a top and a bottom side, means for supporting said platform for movement over the ground, said platform having a front edge and a rear edge and opposite side edges extending from between said front and rear edges, said means for supporting said platform including a pair of wheels rotatably mounted on said platform adjacent said front edge and a pair of wheels rotatably mounted on said platform adjacent said rear edge, an aperture in said platform for receiving and supporting a motor driven cutting device, releasable clamping means movably mounted on said top side of said platform for securely holding the cutting device in said aperture with the cutting element disposed to extend from said bottom side of said platform and with the motor on said top side thereof above said aperture, said clamping means including first and second retaining arms each having one end pivotably mounted on said top side of said platform at spaced apart locations, each arm being pivotable between an open position, wherein said aperture in said platform is unobstructed by said arms, and a closed position, wherein each said arm extends to a respective portion of said platform on the side of said aperture opposite to said respective locations, said platform having grasping means for engaging and releasably holding the other ends of said retaining arms so that, when a motor housing is disposed in said aperture, said retaining arms will engage the housing when said retaining arms are in said closed position, one of said side edges of said platform having a leg member having one end mounted on said platform and movable between a retracted and an extended position, the other end of said leg member having ground engaging means so that, when said leg member is in said extended position, with said ground engaging means in contact with the ground, said platform will be tilted with respect to the horizontal and the wheels on said one side edge will be out of contact with the ground.

3. The carriage as claimed in claim 2 wherein said ground engaging means is a wheel rotatably mounted on said other end of said leg member.

4. The carriage as claimed in claim 2 wherein said platform includes handle mounting means mounted on said top side of said platform adjacent said rear edge.

5. The carriage as claimed in claim 4 wherein said handle mounting means includes a first handle support permitting pivotal movement about an axis and a second handle support permitting pivotal movement about another axis that extends perpendicular to said axis.

6. The carriage as claimed in claims 4 or 5, where a telescoping handle is attached to said handle mounting means.

7. The carriage as claimed in any of the claim 1 or 2 where the motor housing is of the type having a skirt portion surrounding one end of the motor housing, said retaining arms being mounted on said platform so as to engage the skirt portion on opposite sides of the housing.

8. The carriage as claimed in claim 7 wherein said retaining arms have wall means surrounding said aperture in said platform for engaging the skirt portion of the motor housing.

9. The carriage as claimed in claim 1 or 2 wherein said platform is provided with cable cutting means mounted on said bottom side of said platform spaced a selected distance from said aperture.

* * * * *